United States Patent [19]
Yabuki et al.

[11] Patent Number: 5,482,285
[45] Date of Patent: Jan. 9, 1996

[54] THREE-PIECE SOLID GOLF BALL

[75] Inventors: Yoshikazu Yabuki, Akashi; Hidenori Hiraoka; Yoshimasa Koizumi, both of Kobe, all of Japan

[73] Assignee: Sumitomo Rubber Industries, Ltd., Kobe, Japan

[21] Appl. No.: 186,614

[22] Filed: Jan. 26, 1994

[30] Foreign Application Priority Data

Jan. 26, 1993 [JP] Japan .................................. 5-031417

[51] Int. Cl.⁶ ..................................................... A63B 37/06
[52] U.S. Cl. ............................................................ 273/228
[58] Field of Search ........................... 273/228, 62, 220, 273/229

[56] References Cited

U.S. PATENT DOCUMENTS

| | | | |
|---|---|---|---|
| 4,714,253 | 12/1987 | Nakahara et al. | 273/228 |
| 4,848,770 | 7/1989 | Shama | 273/228 |
| 5,026,067 | 6/1991 | Gentiluomo | 273/228 X |
| 5,184,828 | 2/1993 | Kim et al. | 273/228 |
| 5,253,871 | 10/1993 | Viollaz | 273/228 |

*Primary Examiner*—George J. Marlo
*Attorney, Agent, or Firm*—Birch, Stewart Kolasch & Birch

[57] ABSTRACT

A three-piece solid golf ball comprising an inner core 1a, an outer core 1b, and a cover formed principally of an ionomer resin, wherein said inner core 1a has a diameter of 10 to 38 mm, said outer core 1b has a specific gravity of 0.2 to 0.79 and has a diameter of 37 to 40 mm and a total weight of the inner core 1a and the outer core 1b is within the range of 32.0 to 39.0 g.

6 Claims, 1 Drawing Sheet

THREE-PIECE SOLID GOLF BALL

BACKGROUND OF THE INVENTION

1. Field of the Invention

The present invention relates to a three-piece solid golf ball formed by coating a solid core composed of two layers, i.e., an inner core and an outer core with a cover.

2. Description of the Prior Art

Most of conventional three-piece golf balls, i.e., golf balls having a three-layer structure have been so-called thread-wound golf balls which are formed by wrapping rubber thread around a center portion which is solid or filled with a liquid material, and then coating the rubber thread layer with a cover made of a natural or synthetic resin material (e.g., Japanese Patent Laid-Open Publication No. SHO 60-168471).

However, with respect to carry the thread-wound golf ball is inferior to a two-piece solid golf ball having a two-layer structure in which a solid core is coated with a cover formed principally of ionomer resin. The two-piece solid golf ball, however, has not been satisfactory with regard to controllability.

SUMMARY OF THE INVENTION

Accordingly, the object of the present invention is to solve the aforementioned problems and provide a golf ball eliciting great carry and good controllability.

The present invention achieves the aforementioned objective by constructing a three-piece solid golf ball so that a solid core has a two-layer construction composed of an inner core and an outer core. The outer core has a specific gravity of 0.2 to 1, and the solid core having the two-layer construction is coated with a cover formed principally of an ionomer resin.

In the present invention, by reducing the specific gravity of the outer core to 0.2 to 1, the outer layer of the golf ball is reduced in weight to thereby reduce the moment of inertia of the golf ball, to that the golf ball is able to spin and loft more than the two-piece solid golf ball thereby improving its controllability and carry.

DETAILED DESCRIPTION OF THE INVENTION

The following describes in detail the construction and the role of each component of the ball of the present invention.

First, reference is made to the structure of a three-piece solid golf ball in conjunction with the attached drawing. FIG. 1 is a sectional view schematically illustrating an exemplified three-piece solid golf ball of the present invention. In FIG. 1, the reference numeral 1 denotes a solid core which is composed of two layers of an inner core 1a and an outer core 1b, the outer core 1b having a specific gravity of 0.2 to 1. The reference numeral 2 denotes a cover for covering the solid core 1 having the aforementioned two-layer structure, the cover 2 formed principally of an ionomer resin.

The aforementioned outer core is composed of a vulcanized rubber containing light-weight filler, a resin containing light-weight filler, a foamed rubber, a foamed resin, or the like.

In order to obtain the vulcanized rubber constituting the outer core, it is preferred to use a rubber composition which comprises, butadiene rubber as a base rubber, and a metallic salt of α- or β-ethylenic unsaturated carboxylic acid as a vulcanizing agent. In concrete, the vulcanizing agent is preferred zinc diacrylate or zinc methacrylate. In a kneading process for the preparation of the rubber composition, α- or β-ethylenic unsaturated carboxylic acid and a metal oxide such as zinc oxide may be reacted with each other to form the metallic salt of α- or β-ethylenic unsaturated carboxylic acid as the vulcanizing agent.

Natural rubber, isoprene rubber, styrene-butadiene rubber, or the like may be appropriately incorporated into the base rubber composed of the butadiene rubber to form the rubber component.

Since the outer core is required to have a specific gravity of 0.2 to 1, light-weight filler is required to be used. It is preferred to use, for example, hollow resin particles or hollow glass particles as the light-weight filler.

An organic peroxide is used as a vulcanization initiator, and typical examples thereof are dicumyl peroxide and like. The vulcanization may be conducted by sulfur or unsaturated ester monomers.

There may be incorporated, as needed, an additive such as a filler, an antioxidant, and the like to the rubber composition for the production of the outer core. As the filler, there can be generally exemplified zinc oxide and barium sulfate.

The rubber composition for the production of the outer core preferably includes 2 to 15 parts by weight of the metallic salt of α- or β-ethylenic unsaturated carboxylic acid, or a combination of 2 to 15 parts by weight of α- or β-ethylenic unsaturated carboxylic acid and 2 to 15 parts by weight of metallic oxide, 30 to 200 parts by weight of the light-weight filler, and 0.5 to 5 parts by weight of the vulcanization initiator with respect to 100 parts by weight of the rubber component.

When the outer core is composed of a foamed resin, the resin can be a thermoplastic resin such as an ionomer resin, polyethylene, and polystyrene, or a thermosetting resin such as a phenol resin.

The arrangement that the outer core has a specific gravity of 0.2 to 1 is required because the outer core is not easily produced when the specific gravity of the outer core is hot greater than 0.2. When the specific gravity of the outer core is not smaller than 1, the effect of reducing the moment of inertia is reduced to consequently reduce the effect of improving the controllability.

The weight of the inner core is adjusted so that the total weight of the inner core and the outer core falls within a range of 32.0 to 39.0 g.

The inner core is composed of a vulcanized rubber, and it is preferred to use butadiene rubber as a base rubber of the rubber composition for the production of the inner core in the same manner as in the outer core. The same rubber composition including the rubber base, vulcanizing agent, vulcanization initiator, and antioxidant materials as in the outer core can be used.

In order to adjust the total weight of the entire core, it is required to use a filler having a great specific gravity. Examples of such a filler are tungsten, tungsten carbide, barium sulfate, and zinc sulfate, however, the filler is not limited to these substances. A vulcanizing agent different from that of the outer core can be used.

The rubber composition for the production of the inner core preferably includes 5 to 50 parts by weight of the metallic salt of α- or β-ethylenic unsaturated carboxylic acid, or a combination of 5 to 50 parts by weight of α- or β-ethylenic unsaturated carboxylic acid and 5 to 50 parts by weight of metallic oxide, 3 to 300 parts by weight of the filler, and 0.5 to 5 parts by weight of the vulcanization initiator with respect to 100 parts by weight of the rubber component.

Since the specific gravity of the inner core is required to be adjusted according to the specific gravity of the outer core so as to set the total weight of the entire core in a specific range, the amount of the filler can vary widely as described above.

The outer diameter of the inner core and the outer diameter of the outer core (core diameter) are not limitative. However, the inner core preferably has an outer diameter of 10 to 38 mm, and the outer core preferably has an outer diameter of 37 to 40 mm, depending on the size of the outer diameter of the inner core.

The inner core is usually produced by putting a rubber composition for the production of the inner core into a mold, and vulcanizing and molding the same by means of a press. The vulcanization in the press-molding process is preferably conducted at a temperature of 130° to 180° C. for 10 to 50 minutes. Note that the temperature in the vulcanization process is not always required to be constant, and may be changed in two or more steps.

When the outer core is formed from vulcanized rubber, the outer core is usually formed by adhering a rubber composition for the production of the outer core in the form of a sheet having a desired thickness to an inner core preliminarily produced, and then press-molding. The vulcanization conditions in the press-molding process can be the same as in producing the inner core.

However, the above-mentioned arrangement is not limitative, and therefore a method of forming a half shell and adhering the same can be adopted, as well as an injection molding method.

Although it is more appropriate that the process is referred to as crosslinking rather than as vulcanization because the vulcanization of the rubber composition does not always require crosslinking by sulfur in forming the inner core and the outer core, the process is referred to as vulcanization in the present specification according to usual practice.

When the outer core is formed from foamed resin the outer core is injection-molded or press-molded. In the case of injection molding, the process is carried out preferably at a temperature of 200° to 250° C. for a heating time of 2 to 15 minutes in the mold, and a cooling time of 1 to 5 minutes. In the case of pressing, the process is carried out, preferably, at a temperature of 240° to 250° C. for, a heating time of 5 to 30 minutes in the mold, and a cooling time of 1 to 10 minutes.

The core having a two-layer structure composed of the inner core and the outer core is referred to as the solid core in the present invention. The above expression is in contrast to the thread-wound core (core formed by winding a rubber thread around the center portion which is solid or filled with a liquid material). As is apparent from the fact that a foamed material may be used as the outer core, the core is not always required to be solid.

The cover is formed by coating a cover material prepared by appropriately incorporating inorganic oxide such as titanium dioxide ($TiO_2$) or the like into a resin component formed principally of an ionomer resin around the solid core having the aforementioned two-layer structure.

In the coating process, normally the injection molding method is adopted, however, the coating method is not limited to the injection molding method. The arrangement that the resin component of the cover is formed principally of ionomer resin means that ionomer resin is used singly as a resin component, or that a resin component which is formed principally of ionomer resin and blended appropriately with a resin such as polyethylene and polyamide, a rubber, or the like is used.

A thickness of the cover is not limitative, however, it is normally set at 1.4 to 2.7 mm. Then desired dimples are formed in the process of forming the cover, and painting, marking, and the like are effected if necessary after the formation of the cover.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

Figure 1:
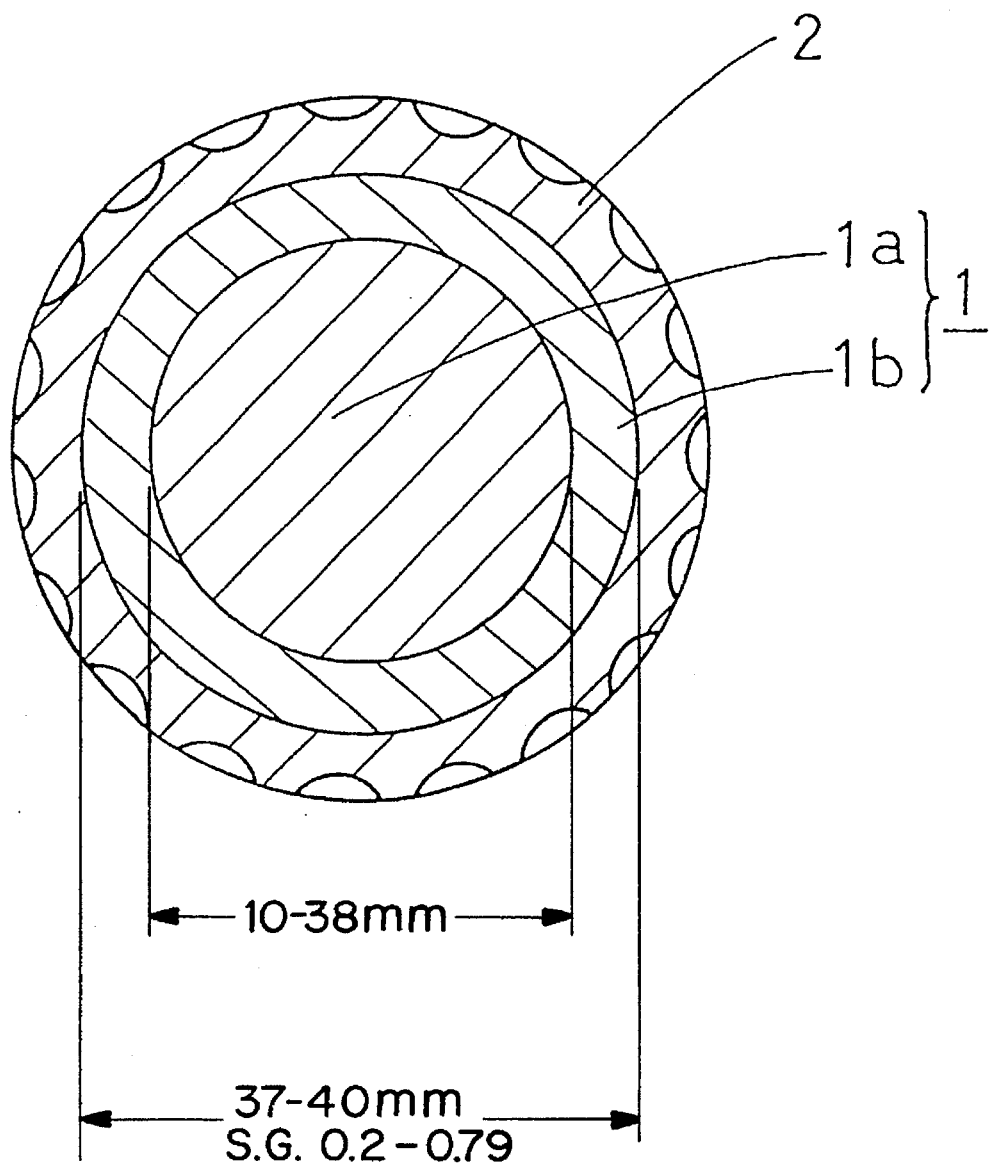
FIG. 1 is a sectional view schematically illustrating an exemplified three-piece solid golf ball of the present invention.

Then the following describes in detail the present invention based on several examples thereof. Note that the present invention is not limited to the examples. Although each core produced in the examples is a solid core, it may be referred to simply as the "core".

Examples 1 through 3 and Comparative Examples 1 and 2

The components as shown in Tables 1 and 2 were kneaded to produce rubber compositions of Examples 1 through 3 and Comparative Examples 1 and 2 for the production of the inner cores, formed into sheets, put into a mold, and vulcanized by pressing in molding conditions as shown in Tables 1 and 2 to produce inner cores.

The outer diameter, weight, and specific gravity of the obtained Examples 1 through 3 and Comparative Examples 1 and 2 are shown in Tables 1 and 2. An amount of each material shown in Tables 1 and 2 is in units of parts by weight. Table 1 shows the components, molding conditions, and physical properties of the inner cores of Examples 1 through 3, while Table 2 shows those of Comparative Examples 1 and 2. The used butadiene rubber was JSR BR11 (trade name) of Japan Synthetic Rubber Co., Ltd., and the same material was used for the production of the outer core. The used antioxidant was Yoshinox 425 (trade name) produced by Yoshitomi Pharmaceutical Industries Co., Ltd.

TABLE 1

| | [Inner Core] | | |
|---|---|---|---|
| | Example 1 | Example 2 | Example 3 |
| Butadiene rubber | 100 | 100 | 100 |
| Zinc diacrylate | 20 | 20 | 20 |
| Zinc oxide | 285 | 100 | 228 |
| Antioxidant | 0.5 | 0.5 | 0.5 |
| Dicumyl peroxide | 1.0 | 1.0 | 1.0 |

TABLE 1-continued

[Inner Core]

|  | Example 1 | Example 2 | Example 3 |
|---|---|---|---|
| Molding cond. (°C.-min.) | 160–30 | 160–30 | 160–30 |
| Outer diameter (mm) | 24 | 30 | 30 |
| Weight (g) | 17.0 | 22.5 | 30.4 |
| Specific gravity (23° C.) | 2.35 | 1.59 | 2.15 |

TABLE 2

[Inner Core]

|  | Comparative Example 1 | Comparative Example 2 |
|---|---|---|
| Butadiene rubber | 100 | 100 |
| Zinc diacrylate | 20 | 20 |
| Zinc oxide | 68 | 40 |
| Antioxidant | 0.5 | 0.5 |
| Dicumyl peroxide | 1.0 | 1.0 |
| Molding cond. (°C.-min.) | 160–30 | 160–30 |
| Outer diameter (mm) | 24 | 30 |
| Weight (g) | 10.3 | 17.8 |
| Specific gravity (23° C.) | 1.42 | 1.26 |

Then rubber compositions as shown in Table 3 for the production of the outer cores were prepared for Examples 1 and 2, while rubber compositions as shown in Table 4 for the production of the outer cores were prepared for Comparative Examples 1 and 2.

The obtained rubber compositions for the production of the outer cores were each formed into a sheet, adhered to the surface of the inner cores of Examples 1 and 2 and Comparative Examples 1 and 2 previously produced, and vulcanized by pressing in molding conditions as shown in Tables 3 and 4 to be an outer core to thereby produce each core.

Regarding Example 3, a mixture of ionomer resin and foaming agent as shown in Table 3 is injection-molded around the inner core of Example 3 previously produced at a temperature of 240° C. for 10 minutes to be an outer core to thereby produce a core.

The outer diameter of the obtained outer core (the same as the outer diameter of the core), the specific gravity of the outer core, and the core weight are shown in Tables 3 and 4. An amount of each material shown in Tables 3 and 4 is in units of parts by weight. Table 3 shows the components, molding conditions, properties of the compositions for the production of outer cores of Examples 1 through 3, while Table 4 shows those of Comparative Examples 1 and 2.

TABLE 3

[Outer Core]

|  | Example 1 | Example 2 | Example 3 |
|---|---|---|---|
| Butadiene rubber | 100 | 100 | — |
| Zinc diacrylate | 5 | 5 | — |
| Zinc oxide | 5 | 5 | — |
| Hollow glass particle *1 | 70 | 70 | — |
| Dicumyl peroxide | 2 | 2 | — |
| Ionomer resin *2 | — | — | 100 |
| Foaming agent *3 (master batch) | — | — | 50 |
| Molding cond. (°C.-min.) | 150–30 | 150–30 | 240–10 |
| Outer diameter (mm) | 38.4 | 38.4 | 38.4 |
| Specific gravity (23° C.) | 0.79 | 0.79 | 0.28 |
| Core weight (g) | 34.7 | 34.7 | 34.7 |

Note
*1: Glassbubbles S60/10000 (trade name) produced by Sumitomo 3M Co., Ltd.
*2: Hi-milan 1705 (trade name) produced by Mitsui Du Pont Polychemical Co., Ltd.
*3: PolysurenI 0600HL (trade name) produced by Eiwa Kasei Co., Ltd.

TABLE 4

[Outer Core]

|  | Comparative Example 1 | Comparative Example 2 |
|---|---|---|
| Butadiene rubber | 100 | 100 |
| Zinc diacrylate | 15 | 15 |
| Zinc oxide | 15 | 15 |
| Hollow glass ball | — | — |
| Dicumyl peroxide | 2 | 2 |
| Ionomer resin | — | — |
| Foaming agent (master batch) | — | — |
| Molding cond. (°C.-min.) | 150–30 | 150–30 |
| Outer diameter (mm) | 38.4 | 38.4 |
| Specific gravity (23° C.) | 1.09 | 1.09 |
| Core weight (g) | 34.7 | 34.7 |

Then a cover material was prepared by incorporating 2 parts by weight of titanium dioxide ($TiO_2$) into 100 parts by weight of ionomer resin [a mixture of Hi-milan 1706 (trade name) and Hi-milan 1605 (trade name) produced by Mitsui Du Pont Polychemical mixed at a ratio of 50:50 by weight] and mixing the same. The cover material was coated on each core by an injection molding method to produce three-piece solid golf balls having an outer diameter of 42.7 mm.

The obtained golf balls were each subjected to measurement of weight, compression according to PGA representation, moment of inertia, and flight performance. The results are shown in Tables 5 and 6. The flight performance was examined with regard to spin, carry, controllability, and trajectory. The values of spin and carry were obtained by means of a swing robot using a driver at a high speed of 45 m/s (expressed by W1·45 m/s in Tables 5 and 6) and by means of the swing robot using a five-iron at a head speed of 38 m/s (expressed by I5·38 m/s in Tables 5 and 6).

Methods for measuring the moment of inertia and spin, and the method for evaluating the controllability are as follows.

Moment of Inertia

Each ball was put in a basket hung by a wire, and the basket was turned by eight turns and then released to measure the cycle of rotation of the ball. An average of three times of the above-mentioned operations was obtained to derive the moment of inertia from the cycle of rotation of the ball, the moment of inertia of the basket, and the rigidity of the wire according to the equations:

Moment of inertia of the basket:

$$I_0 = [I_2 T_1^2 - I_1 T_2^2]/[T_2^2 - T_1^2].$$

Rigidity of the wire:

$$H=[8L\pi(I_2-I_1)]/[R^4(T_2^2-T_1^2)],$$

and
Moment of inertia of the ball:

$$I_b=[HR^4/8L\pi]+T^2-I_0$$

where
- $T_1$: Cycle of large steel ball,
- $T_2$: Cycle of small steel ball,
- $I_1$: Moment of inertia of large steel ball (487.2021 gcm$^2$),
- $I_2$: Moment of inertia of small steel ball (326.5804 gcm$^2$),
- L: Length of wire (120 cm),
- R: Diameter of wire (0.15 mm), and
- T: Cycle of rotation of ball (sec.)

Spin

Spin was calculated by photographing.

Controllability

Through a hitting test by a professional golfer using a driver and an iron, the following evaluations were made.
- Driver: Curvability of each ball when it is subjected to intentional draw or fade.
- Iron: Back spin performance (stoppability) with a short iron.

Table 5 shows the physical properties of the golf balls of Examples 1 through 3, while Table 6 shows the physical properties of the golf balls of Comparative Examples 1 and 2. Table 6 additionally shows the results of examining the physical properties of a standard two-piece solid golf ball and a standard thread-wound golf ball. In Table 6, the two-piece solid golf ball is abbreviated to "two-piece", and the thread-wound golf ball is abbreviated to "thread-wound".

The two-piece solid golf ball shown in Table 6 was formed by vulcanizing and molding a rubber composition incorporating 30 parts by weight of zinc diacrylate, 20.5 parts by weight of zinc oxide, 0.5 part by weight of antioxidant, and 1.5 parts by weight of dicumyl peroxide into 100 parts by weight of butadiene rubber at a molding condition of 155° C. for 30 minutes. The obtained solid core was coated with the same ionomer resin cover as described hereinbefore to have an outer diameter of 42.7 mm, the solid core having an outer diameter of 38.4 mm and a weight of 34.7 g.

The thread-wound golf ball was formed by coating a thread-wound core with the same ionomer resin cover as described above to have an outer diameter of 42.7 mm, wherein the thread-wound core has an outer diameter of 38.8 mm and a weight of 35.3 g.

TABLE 5

[Physical properties of golf balls]

|  | Example 1 | Example 2 | Example 3 |
| --- | --- | --- | --- |
| Weight (g) | 45.3 | 45.3 | 45.3 |
| Compression (PGA) | 95 | 94 | 94 |
| Moment of inertia | 76.0 | 76.5 | 75.0 |
| In the case of W1 · 45 m/s, |  |  |  |
| Spin (rpm) | 3340 | 3300 | 3380 |
| Carry (yard) | 231 | 231.5 | 230 |

TABLE 5-continued

[Physical properties of golf balls]

|  | Example 1 | Example 2 | Example 3 |
| --- | --- | --- | --- |
| In the case of I5 · 38 m/s, |  |  |  |
| Spin (rpm) | 4700 | 4650 | 4750 |
| Carry (yard) | 168 | 168.5 | 167 |
| Controllability | Good | Good | Good |
| Trajectory | Good for easy loft | Good for easy loft | Good for easy loft |

TABLE 6

[Physical properties of golf balls]

|  | Comparative Example 1 | Comparative Example 2 | Two-piece | Thread-wound |
| --- | --- | --- | --- | --- |
| Weight (g) | 45.3 | 45.3 | 45.3 | 45.3 |
| Compression (PGA) | 95 | 95 | 94 | 95 |
| Moment of inertia | 78.0 | 78.5 | 80.9 | 75.5 |
| In the case of W1 · 45 m/s: |  |  |  |  |
| Spin (rpm) | 3150 | 3120 | 3100 | 3400 |
| Carry (yard) | 228.5 | 228.5 | 229 | 220 |
| In the case of I5 · 38 m/s: |  |  |  |  |
| Spin (rpm) | 4470 | 4450 | 4400 | 4800 |
| Carry (yard) | 165 | 165 | 166 | 163 |
| Controllability | Bad | Bad | Bad | Good |
| Trajectory | Low dull flight | Low dull flight | Low dull flight | Good for easy loft |

As shown in Table 5, the golf balls of Examples 1 through 3 exhibit a spin as great as that of the thread-wound golf ball as shown in Table 6, good controllability and trajectory, and a carry greater than that of the thread-wound golf ball and that of the three-piece solid golf ball.

In contrast to the above, since the outer cores of the golf balls of Comparative Examples 1 and 2, which are the same three-piece solid golf balls as Examples 1 through 3, have a specific gravity of not smaller than 1, the balls exhibit almost the same physical properties as those of the two-piece solid golf ball, less spin, and bad controllability and trajectory as shown in Table 6.

According to the present invention described as above, a three-piece solid golf ball exhibiting a great carry and a good controllability can be provided by making the solid core using a two-layer structure of an inner core and an outer core, limiting the specific gravity of the outer core within a range of 0.2 to 1, and coating the two-layer solid core with a cover formed principally of ionomer resin.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A three-piece solid golf ball comprising an inner core 1$a$, an outer core 1,$b$ and a cover formed principally of ionomer resin, wherein said inner core 1$a$ has a diameter of 10 to 38 mm, said outer core 1$b$ has a specific gravity of 0.2 to 0.79 and has a diameter of 37 to 40 mm and a total weight of the inner core 1$a$ and the outer core 1$b$ is within the range of 32.0 to 39.0 g.

2. The three-piece solid golf ball according to claim 1 wherein said outer core 1$b$ is prepared by vulcanizing a rubber composition which comprises a butadiene rubber, a metallic salt of α- or β-ethylenic unsaturated carboxylic acid, a metallic oxide, a light-weight filler and a vulcanization initiator.

3. A three-piece solid golf ball according to claim 1 wherein said outer core 1$b$ includes a foamed resin or foamed rubber.

4. The three-piece solid golf ball according to claim 1 wherein said inner core 1$a$ is prepared by vulcanizing a rubber composition which comprises a butadiene rubber, a metallic salt of α- or β-ethylenic unsaturated carboxylic acid, a metallic oxide, a filler and a vulcanization initiator.

5. The three-piece solid golf ball according to claim 1 wherein said cover comprises an ionomer resin and an inorganic oxide.

6. The three-piece solid golf ball according to claim 1 wherein said cover has a thickness of 1.4 to 2.7 mm.

* * * * *